(12) United States Patent
Belkin et al.

(10) Patent No.: US 11,928,812 B2
(45) Date of Patent: Mar. 12, 2024

(54) SYSTEMS AND METHODS FOR INSPECTING MULTI-MODE ASSET STATUS IN COMMUNICATION-DENIED ENVIRONMENTS

(71) Applicant: Caterpillar Inc., Peoria, IL (US)

(72) Inventors: Anatoly Belkin, Glenview, IL (US); Arnold Sheynman, Northbrook, IL (US)

(73) Assignee: Caterpillar Inc., Peoria, IL (US)

(*) Notice: Subject to any disclaimer, the term of this patent is extended or adjusted under 35 U.S.C. 154(b) by 370 days.

(21) Appl. No.: 17/466,339

(22) Filed: Sep. 3, 2021

(65) Prior Publication Data

US 2023/0072516 A1   Mar. 9, 2023

(51) Int. Cl.
| | | |
|---|---|---|
| *G06T 7/00* | (2017.01) |
| *G06K 7/14* | (2006.01) |
| *G06Q 10/20* | (2023.01) |
| *G06V 20/10* | (2022.01) |
| *G07C 5/00* | (2006.01) |
| *G06N 20/00* | (2019.01) |

(52) U.S. Cl.
CPC ............ *G06T 7/001* (2013.01); *G06K 7/1413* (2013.01); *G06Q 10/20* (2013.01); *G06V 20/10* (2022.01); *G07C 5/006* (2013.01); *G06N 20/00* (2019.01); *G06T 2207/30164* (2013.01)

(58) Field of Classification Search
CPC ..... G06T 7/0002; G06T 7/0004; G06T 7/001; G06T 2207/30164; G06T 2207/30268; G06V 10/70; G06V 10/74; G06V 20/59; G06V 2201/02; H04L 1/00; H04L 1/001; H04L 1/0033; H04W 4/44; H04W 8/24
See application file for complete search history.

(56) References Cited

U.S. PATENT DOCUMENTS

| | | |
|---|---|---|
| 8,825,271 B2 | 9/2014 | Chen |
| 9,183,441 B2 | 11/2015 | Blumer et al. |
| 9,202,098 B2 | 12/2015 | Lewis et al. |
| 10,152,641 B2 | 12/2018 | Amico et al. |
| 2007/0236366 A1 | 10/2007 | Gur et al. |

(Continued)

FOREIGN PATENT DOCUMENTS

| | | |
|---|---|---|
| CN | 106529559 A | 3/2017 |
| CN | 109961656 A | 7/2019 |

(Continued)

OTHER PUBLICATIONS

Machine translation of CN 110493116 A (published Nov. 22, 2019). (Year: 2019).*

(Continued)

*Primary Examiner* — Andrew W Johns

(57) ABSTRACT

The present technology is generally directed to systems and methods for inspecting an asset in a communication-denied environment. The present technology can include receiving, via an electronic device, an image of a dashboard of the asset; determining, based on the image, a working mode and one or more status identifiers of the asset; transmitting the working mode and the one or more status identifiers to an inspection system; and/or receiving information regarding the status of the asset based on the working mode and one or more status identifiers.

20 Claims, 7 Drawing Sheets

(56) References Cited

U.S. PATENT DOCUMENTS

2018/0211122 A1    7/2018  Amico et al.
2022/0204026 A1*   6/2022  Kim et al. ......... G01C 21/3415

FOREIGN PATENT DOCUMENTS

| CN | 110493116 A  | 11/2019 |
| GB | 2523359 A    | 8/2015  |
| KR | 101430881 B1 | 8/2014  |
| KR | 200486923 Y1 | 8/2018  |
| WO | 2015124939 A1| 8/2015  |

OTHER PUBLICATIONS

Written Opinion and International Search Report for Int'l. Patent Appln. No. PCT/US2022/041500, dated Dec. 9, 2022 (13 pgs).

* cited by examiner

SYSTEMS AND METHODS FOR INSPECTING MULTI-MODE ASSET STATUS IN COMMUNICATION-DENIED ENVIRONMENTS

TECHNICAL FIELD

The present disclosure is generally directed to systems and methods for inspecting assets in communication-denied environments, and in particular, to inspecting the status of industrial machines in multiple working modes in communication-denied environments.

BACKGROUND

Information can be collected to monitor or inspect one or more operational characteristics of an asset. Such information can be delivered to inspection systems using an asset's built in equipment. However, only about 15% of assets in use have built-in communication equipment, such that many assets are "communication-denied" and not configured to deliver this information to the inspection system. Accordingly, these communication-denied assets may be more likely to fail due to the lack of access to the inspection systems and an inability to determine when maintenance is necessary.

Efforts have been made to inspect asset statuses. For example, U.S. Pat. No. 10,152,641 to Amico ("Amico") purports to disclose automated extraction of data associated with a vehicle from an image of the vehicle's dashboard using artificial intelligence technology. However, Amico fails to consider vehicles having multiple working modes.

SUMMARY

In some embodiments, a method for inspecting an asset in a communication-denied environment can include receiving, via an electronic device, an image of a dashboard of the asset. The image can be received during a communication-denied period. The method can further include determining, based on the image, a working mode and one or more status identifiers of the asset. The one or more status identifiers can correspond to a status of the asset when the asset is in the working mode. The method can further include transmitting, when a communication environment is available, the working mode and the one or more status identifiers to an inspection system. In some embodiments, transmitting the working mode and the one or more status identifiers can include at least one of the following: (i) confirming sufficiency of the communication environment to transmit, (ii) receiving an acknowledgement of the transmission without error, and/or (iii) queuing multiple transmissions when more than one working mode and/or status identifier is selected for transmission. The method can further include, in response to the transmitting the working mode and the one or more status identifiers, receiving information regarding the status of the asset based on the transmitted working mode and one or more status identifiers.

In some embodiments, a system for inspecting an asset in a communication denied environment can include one or more processors; and one or more memory devices having stored thereon instructions that when executed by the one or more processors cause the one or more processors: (i) receive, via an electronic device, an image of a dashboard of the asset; (ii) determine, based on the image, a working mode and one or more status identifiers of the asset; (iii) when a communication environment is available, transmit the working mode and the one or more status identifiers to an inspection system; and/or (iv) in response to the transmitting, receive information regarding the status of the asset based on the transmitted working mode and one or more status identifiers. The image can be received during a communication-denied period. The one or more status identifiers can correspond to a status of the asset when the asset is in the working mode. In some embodiments, the transmitting can include confirming sufficiency of the communication environment to transmit, receiving an acknowledgement of the transmission without error, and/or queuing multiple transmissions when more than one working mode and/or status identifier is selected for transmission.

In some embodiments, one or more non-transitory computer-readable media can store computer-executable instructions that, when executed by one or more processors, can cause the one or more processors to perform one or more operations. The operations can include receiving, via an electronic device, an image of a dashboard of the asset. The image can be received during a communication-denied period. The operations can further include determining, based on the image, a working mode and one or more status identifiers of the asset. The one or more status identifiers can correspond to a status of the asset when the asset is in the working mode. The operations can further include, when a communication environment is available, transmitting the working mode and the one or more status identifiers to an inspection system. In some embodiments, the transmitting can include one or more of the following: confirming sufficiency of the communication environment to transmit, receiving an acknowledgement of the transmission without error, and/or queuing multiple transmissions when more than one working mode and/or status identifier is selected for transmission. The operations can further include, in response to the transmitting, receiving information regarding the status of the asset based on the transmitted working mode and one or more status identifiers.

Other aspects of the present technology will be described hereinafter. The features described herein can be used separately or together, or in various combinations of one or more of them.

BRIEF DESCRIPTION OF THE DRAWINGS

The systems and methods described herein may be better understood by referring to the following Detailed Description in conjunction with the accompanying drawings.

Figure 1A:
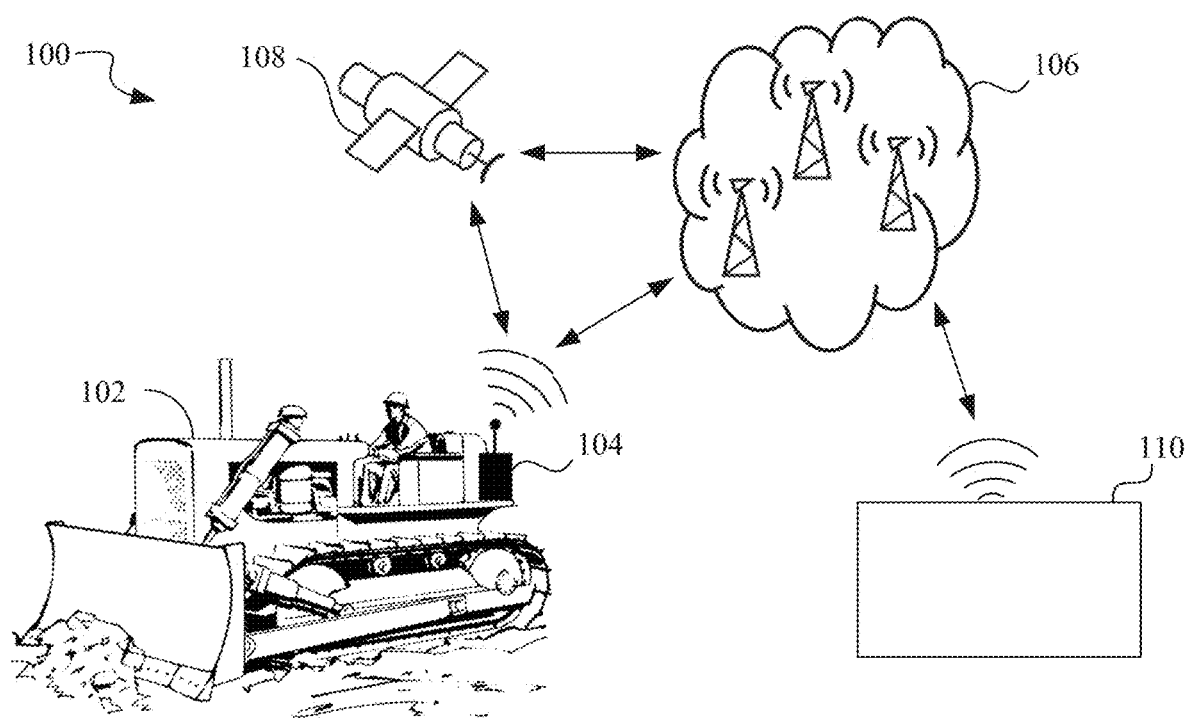
FIG. 1A is a schematic illustration of an asset in a communication-enabled environment.

The drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. Rather, the embodiments are intended to cover all modifications, combinations, equivalents, and alternatives falling within the scope of this disclosure.

DETAILED DESCRIPTION

Various embodiments of the present technology will now be described in further detail. The following description provides specific details for a thorough understanding and enabling description of these embodiments. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description. Accordingly, embodiments of the present technology may include additional elements or exclude some of the elements described below with reference to the Figures, which illustrate examples of the technology.

The terminology used in this description is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such.

FIG. 1A is a schematic illustration of an asset 102 in a communication-enabled environment 100. The asset 102 includes a communication element 104, such that the asset 102 is communication-enabled. The communication element 104 is configured to communicate (e.g., transmit and/or receive data, messages, etc.) with one or more networks 106 (e.g., via a cellular connection, WiFi networks, Bluetooth, etc.) In some embodiments, the asset 102 can be configured to communicate the with the network(s) 106 via one or more relays 108 (e.g., satellites, range-extenders, repeaters, etc.). The network 106 can be connected (e.g., communicatively connected, via, e.g., a wired and/or wireless connection) to an inspection system 110, such that the communication element 104 can communicate with the inspection system 110. Accordingly, the communication element 104 can be used to communicate data associated with the asset 102 to and/or from the inspection system 110 to remotely determine the status of the asset 102.

Figure 1B:
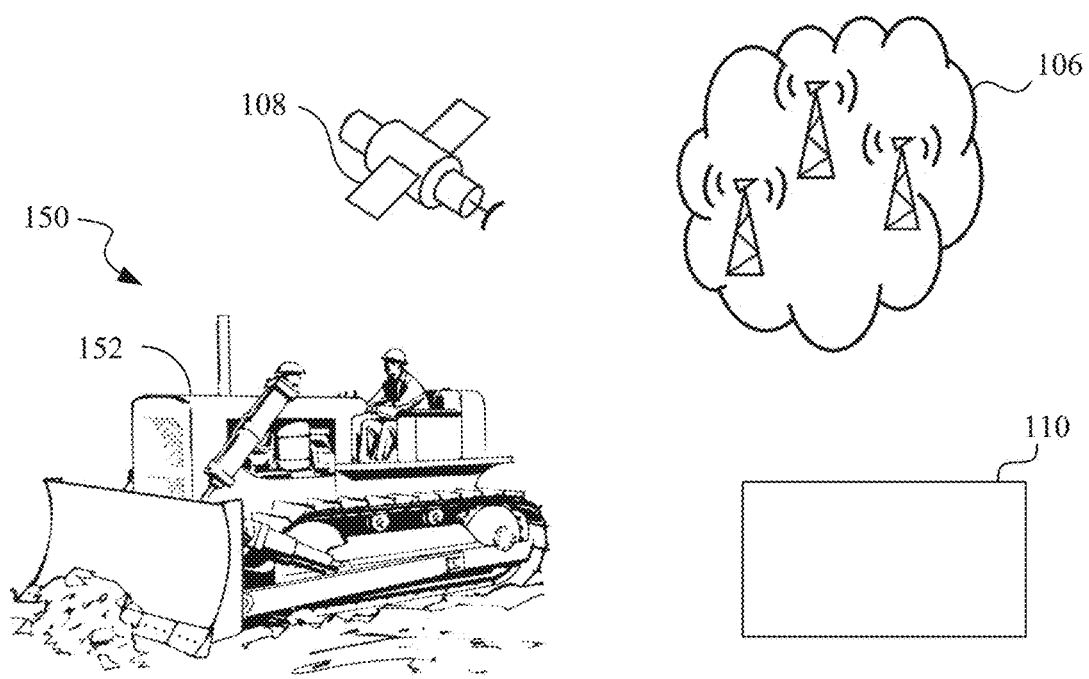
FIG. 1B is a schematic illustration of an asset in a communication-denied environment.

FIG. 1B is a schematic illustration of an asset 152 operating in a communication-denied environment 150. The asset 152 can include one or more trucks, tracked-type tractors, excavators, wheel loaders, front-end loaders, vehicles, industrial machines, machines, equipment, and/or any other suitable asset. In the illustrated embodiment, the asset 152 is communication-denied, such that the asset 152 lacks a communication element (e.g., communication element 104 of FIG. 1A), and/or is otherwise unable to communicate with the network 106, the relay(s) 108, and/or the inspection system 110. Accordingly, the asset 152 can be unable to exchange information with the inspection system 110. Thus, the inspection system 110 can be unable to remotely determine the status of the asset 152.

Figure 2:
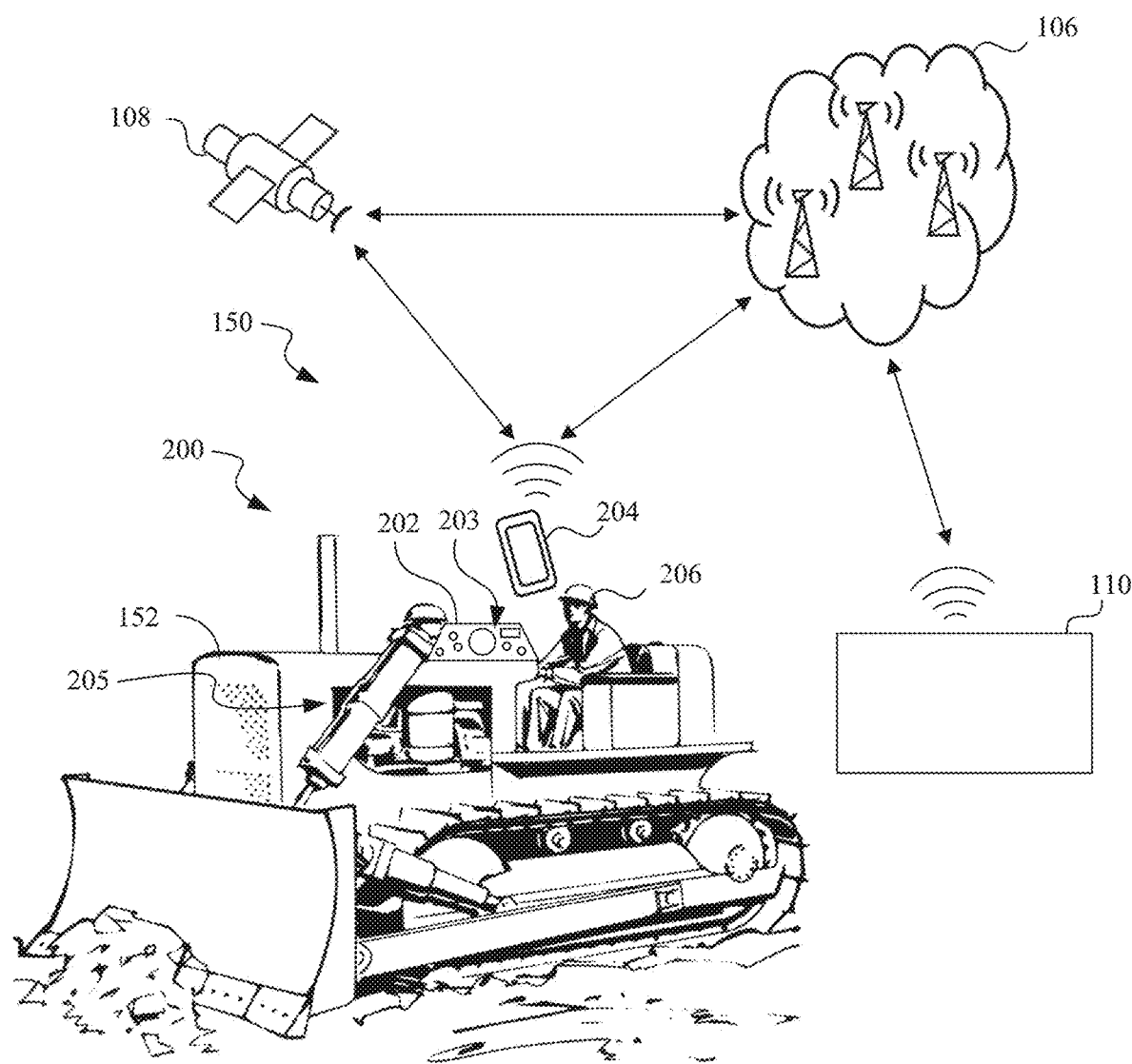
FIG. 2 is a schematic illustration of inspecting the status of an asset in a communication-denied environment, in accordance with various embodiments of the present technology.

FIG. 2 is a schematic illustration of inspecting the status of an asset 152 in a communication-denied environment 150, in accordance with embodiments of the present technology. The asset 152 can include an instrument panel or dashboard 202 ("the dashboard 202"). The dashboard 202 can include one or more indicators (such as the indicators 302 of FIG. 3) configured to display, represent, or otherwise convey data 203 (e.g., parameters, operating characteristics, status identifiers, etc.) associated with the asset 152. The data 203 can include one or more engine speeds, engine temperatures, fuel levels, fuel efficiencies, oil temperatures, oil pressures, mileages, asset usage times, tire pressures, warning lights, check engine statuses, engine coolant temperatures, steering system statuses, brake air pressures, transmission system statuses, alternator malfunction indicators, speedometers, odometers, tachometers, and/or any other suitable data known to those of skill in the art. Additionally, any of the data 203 described herein can represented as a range of values, e.g., a minimum value and a maximum value, or any other suitable range of values.

In some embodiments, the asset 152 includes one or more working modes 205. The asset 152 can be configured to transition or "switch" between each of the working modes 205 automatically, in response to an event, and/or in response to a manual input (e.g., by an asset operator 206). In each working mode 205, one or more operational characteristics of the asset 152 can be altered or adjusted, e.g., so as to provide greater control over how the asset 152 operates. For example, a "power" working mode may increase an asset's engine output so that the asset 152 can, for example, travel faster, move a greater quantity or mass of material, etc., whereas an "economy" working mode may reduce an asset's engine speeds so that the asset 152 can, for example, conserve fuel or have increased fuel efficiency. Accordingly, the data 203 associated with the asset 152 (e.g., engine speed(s), engine temperature range(s), etc.) can be associated with, and vary in response to, the working modes 205. For example, the engine speed can have a first range of values in a first working mode (e.g., a "power" working mode), and the engine speed can have a second range of values less than the first range of values in a second working mode (e.g., an "economy" working mode), and both the first and second ranges of values can represent normal or expected operational characteristics of asset 152 in the respective working mode 205. In some embodiments, the asset's working mode(s) 205 can be identified and/or displayed via the dashboard 202.

The relationship between the working modes 205 and the data 203 is further illustrated by Table 1, below, which includes example data for the hydraulic oil pressure, the hydraulic flow, and the fuel rate for an example asset in a "high power" working mode, a "standard power" working mode, and a "economy" working mode. The data and working modes of Table 1 are intended only as an example, and should not be construed as limitations or as necessary features. Rather, a skilled artisan will appreciate various machines or equipment can have working modes other than those listed in Table 1, and/or have data associated with said working modes generally similar or different than the data in Table 1.

TABLE 1

| | Data Types | | |
|---|---|---|---|
| Working Mode | Hydraulic Oil Pressure Range, MPa | Hydraulic Flow Range, gallons per minute | Fuel Rate Range, gallons per hour |
| High power | 26.0-35.0 | 120-260 | 13.3-16.8 |
| Standard power | 4.1-26.0 | 25-120 | 10.4-13.3 |
| Economy mode | 2.1-4.1 | 20-25 | 5.9-10.4 |

As illustrated by Table 1, for each of the working modes 205, each of the data types can have a different range of values. Each range of values can represent an operating threshold for the associated working mode and data such that, for a given working mode (e.g., High power) and data type (e.g., Hydraulic Oil Pressure), values within the range (e.g., between 26.0 MPa and 35.0 MPa) can represent normal or expected operation (e.g., a normal or expected status) of the asset 152 and values outside the range (e.g., less than 26.0 MPa and/or greater than 35.0 MPa) can represent abnormal or anomalous operation (e.g., an abnormal or anomalous status) of the asset 152. Accordingly, for a given data type, the range of values associated with the operating threshold can vary based on the working mode 205, e.g., such that the data type can have a first operating threshold include a first range of values in a first working mode and a second, different operating thresholding including a second, different range of values in a second, different working mode.

The range of possible data 203 values between various working modes and/or the volume of data 203 collected can increase the difficulty of inspecting the status of the asset 152 in the various working modes 205. In at least some embodiments, for example, an asset operator may need to determine whether an asset is functioning properly in one or more working modes. For communication-enabled assets, such as the communication-enabled asset 102 of FIG. 1A, can communicate directly with the network 106 and/or the inspection system 110 to inspect the operational status of the communication-enabled asset. This can allow the operator to determine, for example, whether the asset is operating normally and/or whether the asset requires maintenance or repair while the asset is in use. However, assets operating in a communication-denied environment 150, such as the asset 152, are unable to directly communication with the network 106 and/or the inspection system 110. Thus, the operator may be unable to determine whether the asset is operating normally in a given working mode and/or whether the asset requires maintenance or repair while the asset is in use.

In some embodiments, an electronic device 204 ("the device 204") can be configured to record, detect, monitor, inspect, and/or otherwise read the data 203 displayed by the dashboard 202. The device 204 can be a component of the asset 152, e.g., configured and/or positioned to observe, detect, monitor, read or otherwise acquire the data 203 from the dashboard 202. The device 204 can be configured to read the data 203 using, for example, one or more cameras, a wired connection with the dashboard 202 and/or the asset 152, a wireless connection with the dashboard 202 and/or the asset 152, and/or any other suitable process or technique for data acquisition known to those of skill in the art. In some embodiments, the device 204 can be the operator's device and include, for example, one or more mobile phones, tablets, tablet computers, laptops, cameras, and/or any other suitable device.

The electronic device 204 can be further configured to communicate with inspection system 110 via the network 106 and/or the relay(s) 108. Accordingly, the device 204 can be configured to communicate data associated with the asset 152 with the inspection system 110. In at least some embodiments, for example, the device 204 can transmit the data 203 (e.g., such as a working mode and/or one or more status identifiers associated with a status of the asset 152) to the inspection system 110, and, in response, can receive information associated with the transmitted data 203 (such as, e.g., the status of the asset 152 in the working mode). This is described in greater detail below and with reference to FIGS. 3 and 4. Thus, the device 204 can allow assets 152 that operate in communication-denied environments 150 to communicate with the inspection system 110, e.g., to allow the operator 206 to inspect (e.g., remotely inspect) the status of the asset 152 in the working modes 205 while in the communication-denied environment 150.

In some embodiments, prior to communicating with the inspection system 110, the device 204 can confirm that the communication environment (e.g., the network 106 and/or the relay(s) 108) is sufficient (e.g., available) to transmit and/or receive data. For example, the device 204 can do at least one of the following: (i) query the network 106 and/or the relay(s) 108 to determine whether the communication environment is such that the network 106 and/or the relay(s) 108 can receive and/or respond to the query, (ii) monitor a data transmission speed (e.g., an data upload speed and/or a data download speed), or (iii) use any other suitable process or technique for confirming communication environment sufficiency (e.g., availability) known to those of skill in the art. If the device 204 determines that the communication environment is insufficient (e.g., unavailable) to transmit, the device 204 can store and/or queue (e.g., in memory, such as the memory 550 of FIG. 5) one or more transmissions, and can transmit the one or more transmissions when the communication environment is sufficient. In some embodiments, the device 204 can be configured to transmit a plurality of transmission, and can queue one or more of the plurality of transmissions as described previously such that the plurality of transmissions can be transmitted in sequence.

In some embodiments, the inspection system 110 and/or the device 204 can provide an asset status pairing acknowledgment and/or notification to indicate that a supervised asset status pairing (e.g., between the device 204 and the inspection system 110) has been confirmed for a particular asset. For example, the device 204 may play an audible notification and/or display a notification upon successfully pairing the inspection system 110 with a particular asset. This can indicate that the device 204 is ready to communicate with the inspection system 110.

In some embodiments, in response to communicating with the inspection system 110, the device 204 can receive an acknowledgment or confirmation that the data was successfully communicated, e.g., transmitted by the network 106 and/or received by the inspection system 110 without error. For example, in response to transmitting data to the inspection system 110 via the network 106 and/or the relay(s) 108, the device 204 can receive an acknowledgment from the inspection system 110 that confirms that the inspection system 110 successfully received the transmitted data, or use any other suitable process or technique for acknowledging/confirming transmissions known to those of skill in the art. This can include, for example, sending the acknowledgment and/or a notification to the device 204, e.g., such as causing the device 204 to display the acknowledgment and/or the notification on a display of the device 204, causing the device 204 to generate one or more sounds or haptic feedback, and/or any other suitable acknowledgment and/or notification.

Figure 3:
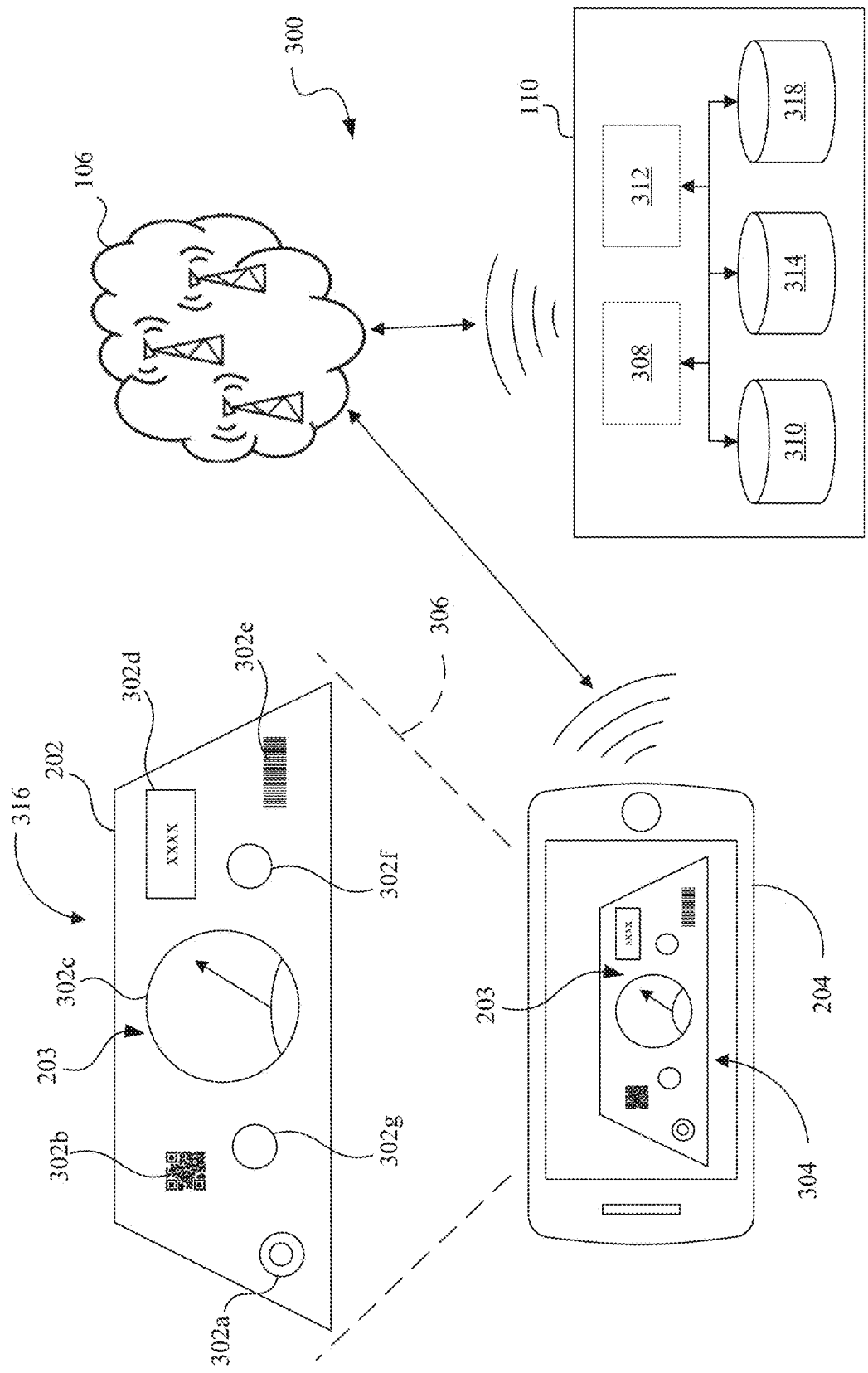
FIG. 3 is a schematic illustration of a system for inspecting the status of the asset of FIG. 2, in accordance with various embodiments of the present technology.

FIG. 3 is a schematic illustration of a system 300 for inspecting the status of the asset 152 of FIG. 2, in accordance with embodiments of the present technology. The system 300 can include the electronic device 204, and can be used to determine the status of the asset 152 based at least in part on the asset's dashboard 202. The dashboard 202 can include one or more indicators 302. In the illustrated embodiment, for example, the dashboard includes a first indicator 302a, a second indicator 302b, a third indicator 302c, a fourth indicator 302d, a fifth indicator 302e, a six indicator 302f, and a seventh indicator 302g ("the indicator(s) 302"). Each of the indicators 302 can represent one or more of the data 203 associated with the asset 152 (FIG. 2) and described previously (e.g., engine speed, fuel level, etc.), Accordingly, each of the indicators 302 can represent a status (e.g., a status identifier) of the asset in a given working mode 205, such that an analysis of the indicator(s) 302 can be used to inspect the status of the asset 152.

The indicators 302 can include one or more lights, analog displays, digital displays, printed graphics, printed text, and/or any other suitable indicators known to those of skill in the art. In the illustrated embodiment, for example, the first indicator 302a is a light, such as a warning light; the third indicator is an analog display, such as an asset speedometer; and the fourth indicator is a digital display, such as a fuel quantity display, a speed display, a fuel economy or efficiency (e.g. miles per gallon, etc.) display, and/or a fuel consumption rate (e.g., gallons per hour, etc.) display. In some embodiments, at least one of the indicators 302 can correspond to a model number, a serial number, a vehicle identification number (VIN), and/or any other suitable identifier of the asset 152 (FIG. 2), and can be used to identify the make and/or model of the asset 152. In the illustrated embodiment, for example, the second indicator 302b is a QR code, the fifth indicator 302e is a bar code, and the second indicator 302b and/or the fifth indicator 302e can correspond to the model number, the serial number, and/or any other suitable asset identifier. In some embodiments, one or more of the indicators 302 (e.g., a working mode indicator) can correspond to the working mode 205 of the asset 152 (FIG. 2).

Although the above description of the dashboard 202 identifies certain indicators 302 as having certain properties or configurations, in other embodiments any of the indicators 302 can correspond to any of the indicator types (e.g., lights, analog displays, etc.) and/or data described herein. Although the dashboard 220 in FIG. 3 includes seven indicators 302a-g, in other embodiments the dashboard 220 can include more or fewer indicators. In at least some embodiments, for example, the dashboard 220 can include between about 1 and about 50 indicators, such as at least 1, 2, 3, 4, 5, 10, 20, or any other suitable number of indicators. In other embodiments, the dashboard 220 can include more than 50 indicators. Additionally, although the indicators 302 in FIG. 3 are illustrated in a specific configuration 316, in other embodiments the indicators 302 can be arranged in any other suitable configuration.

In the illustrated embodiment, the device 204 is used to obtain an image 304 of the dashboard 202 and/or one or more of the indicators 302. In at least some embodiments, for example, the device 204 can include a camera (not shown), and device 204 can be positioned such that the dashboard 202 and/or the indicator(s) 302 are within a field of view 306 of the camera. In other embodiments, the device 204 can obtain and/or receive the data 203 via a wired or wireless connection with the dashboard 202 and/or the asset 152 (FIG. 2).

Once obtained by the device 204, the image 304 can be analyzed, inspected, and/or otherwise processed to determine the working mode and/or one or more status identifiers associated with the asset. In some embodiments, the image 304 can be transmitted to the inspection system 110 (e.g., via the network 106) for analysis. In some embodiments, the inspection system 110 can include a dashboard image analysis engine 308 configured to analyze the image 304. The dashboard image analysis engine 308 can include one or more models (e.g., machine learning models, rules-based models, and/or any other suitable model) configured to determine, based at least in part on the image, (i) the make and/or model of the asset 152 (FIG. 2), (ii) a working mode 205 of the asset 152 (FIG. 2); and/or (iii) one or more status identifiers of the asset 152 (from, e.g., the indicator(s) 302). The dashboard image analysis engine 308 can be configured to analyze the image 304 using (i) optical character recognition (OCR); (ii) image recognition; (using, e.g., a convolutional neural network (CNN) model); and/or any other suitable process or technique known to those of skill in the art. For example, to determine a status identifier associated with the asset 152, the dashboard image analysis engine 308 can read, using OCR, an indicator that corresponds to the status identifier.

In some embodiments, the dashboard image analysis engine 308 can determine the make, model, working mode, and/or one or more status identifiers for the asset 152 based at least partially on a comparison with one or more reference dashboard images. In such embodiments, the dashboard image analysis engine 308 can be trained using one or more reference dashboard images, which can be stored/accessed in a reference dashboard image database 314. Each of the reference dashboard images can correspond to an asset (e.g., a reference asset) and the associated make and/or model of the reference asset. Accordingly, the image 304 can be compared with one or more reference dashboard images associated with reference asset(s) of a generally similar or the same make and/or model. Based at least partially on the comparison, the dashboard image analysis engine 308 can determine the make, model, working mode, and/or one or more status identifiers for the asset 152. Comparing the image 304 to the one or more reference dashboard images can include using at least one of the following: (i) a pixel-by-pixel comparison; (ii) a Hausdorff distance-based comparison; and/or (iii) any other suitable image comparison process or technique. The image 304 and/or the associated make, model, working mode, and/or one or more status identifiers can be saved by the inspection system 110, e.g., in an image database 310.

In some embodiments, the dashboard image analysis engine 308 can determine the make and/or model of the asset 152 (FIG. 2) based at least partially on one of the following: (i) the arrangement 316 of the indicators 302 (e.g., based on a comparison of the image 304 with one or more reference images); (ii) one or more of the indicators 302, as described previously; and/or any other suitable process or technique known to those of skill in the art. In some embodiments, the make, model, working mode, and/or one or more status identifiers can input manually, e.g., by an operator of the asset 152 and/or the device 204, and transmitted to the inspection system 110).

Once working mode and/or the one or more status identifiers have been determined (e.g., by the dashboard image analysis engine 308), the working mode and/or one or more status identifiers can be transferred to (e.g., input into) an asset status analysis engine 312. The asset status analysis engine 312 can be configured to determine a status of the asset 152. For example, based at least partially on the working mode and/or one or more status identifiers the asset status analysis engine 312 can determine whether the one or more status identifiers indicate normal or anomalous operating behavior of the asset 152 for the given working mode.

In some embodiments, determining the status of the asset 152 can include comparing the one or more status identifiers to one or more reference status identifiers associated with a generally similar or a same working mode. As described previously and with reference to FIG. 2, for a given working mode, data associated with the asset can have different value ranges and/or operating thresholds. Accordingly, in at least some embodiments, the asset status analysis engine 312 can compare the one or more status identifiers to one or more reference status identifiers, e.g., to determine whether the one or more status identifiers are within or outside a normal value range and/or operating threshold for a given working mode.

In the illustrated embodiment, for example, the inspection system 110 includes a reference status database 318. The reference status database 318 can contain reference data (e.g., reference status identifiers) corresponding to normal and/or anomalous operating behavior of the asset 152 for the one or more working modes 205. The reference data can include, for example, data (e.g., reference data) collected from other assets (e.g., reference assets), simulation data collected from one or more simulations, and/or any other suitable data. The reference status database 318 can include reference data for a plurality of assets of various makes and/or models. For a given working mode, the asset status analysis engine 312 can access the reference status database 318 and compare the received status identifier(s) to reference data for one or more reference assets having a generally similar or the same model number and/or serial number. Based on the comparison, the asset status analysis engine 312 can determine whether the asset 152 is operating normally for the given working mode. In some embodiments, the asset status analysis engine 312 can include one or more models configured to compare the reference data and the received status identifier(s). The one or more models can include machine learning models, supervised machine learning models, a CNN model, rules-based models, and/or any other suitable model known to those of skill in the art.

Once the asset status analysis engine 312 has determined the status of the asset 152 in the working mode 205, the inspection system 110 can transmit information associated with the determined status to the electronic device 204 (e.g., via the network 106). In at least some embodiments, for example, the information can include:

(i) a request for additional data about the asset 152 (e.g., one or more additional images, a request for a user input, etc.);

(ii) instructions to transition (e.g., automatically transition, prompt the operator 206 to transition, etc.) the asset 152 to another (e.g., a second) working mode and to obtain another image of the dashboard 202 while the asset 152 is in the second working mode;

(iii) if the asset status is anomalous (e.g., not normal/expected), an identification of a component of the asset associated with anomalous status;

(iv) if the asset status is normal/as-expected (e.g., the data 203 are generally similar to, the same as, or otherwise within an operational threshold of the reference data), a message that the asset 152 status is normal/as-expected;

(iv) a recommendation regarding a maintenance event associated with the asset's status, e.g., to determine additional data about and/or to perform one or more tasks to at least partially address or correct the status of the asset 152;

(v) an acknowledgement from the inspection system 110 that confirms that the inspection system 110 successfully received the transmitted data; and/or (vi) any other suitable information associated with the status of the asset.

In response to receiving the transmitted information, the device 204 can, for example, play an audible notification and/or display a notificatication and/or display at least part of the information. The information can be determined by the inspection system 110 (e.g., asset status analysis engine 312), and can be based at least partially on the determined status of the asset.

In some embodiments, one or more aspects of the inspection system 110 can be implemented or performed on the electronic device 204, such that the electronic device 204 can, for example, obtain the image 304, determine the working mode and status identifier(s) from the image, determine the asset status based on the working mode and status identifier(s), and/or present information associated with the determined status without communicating with an external inspection system. As a specific example, in some embodiments the device 204 can include the dashboard image analysis engine 308 such that the image 304 can be analyzed natively on the device 204 (e.g., by one or more processors of the device 204, such as processor 510 of FIG. 5 and/or processing units 704 of FIG. 7). In such embodiments, the working mode and/or the one or more status identifiers can be transmitted to an inspection system 110 directly, rather than transmitting the image 304. In some embodiments, the image 304 can be analyzed on the device 204, transmitted to the inspection system 110, and then analyzed again (e.g., re-analyzed) by the dashboard image analysis engine 308.

Figure 4:
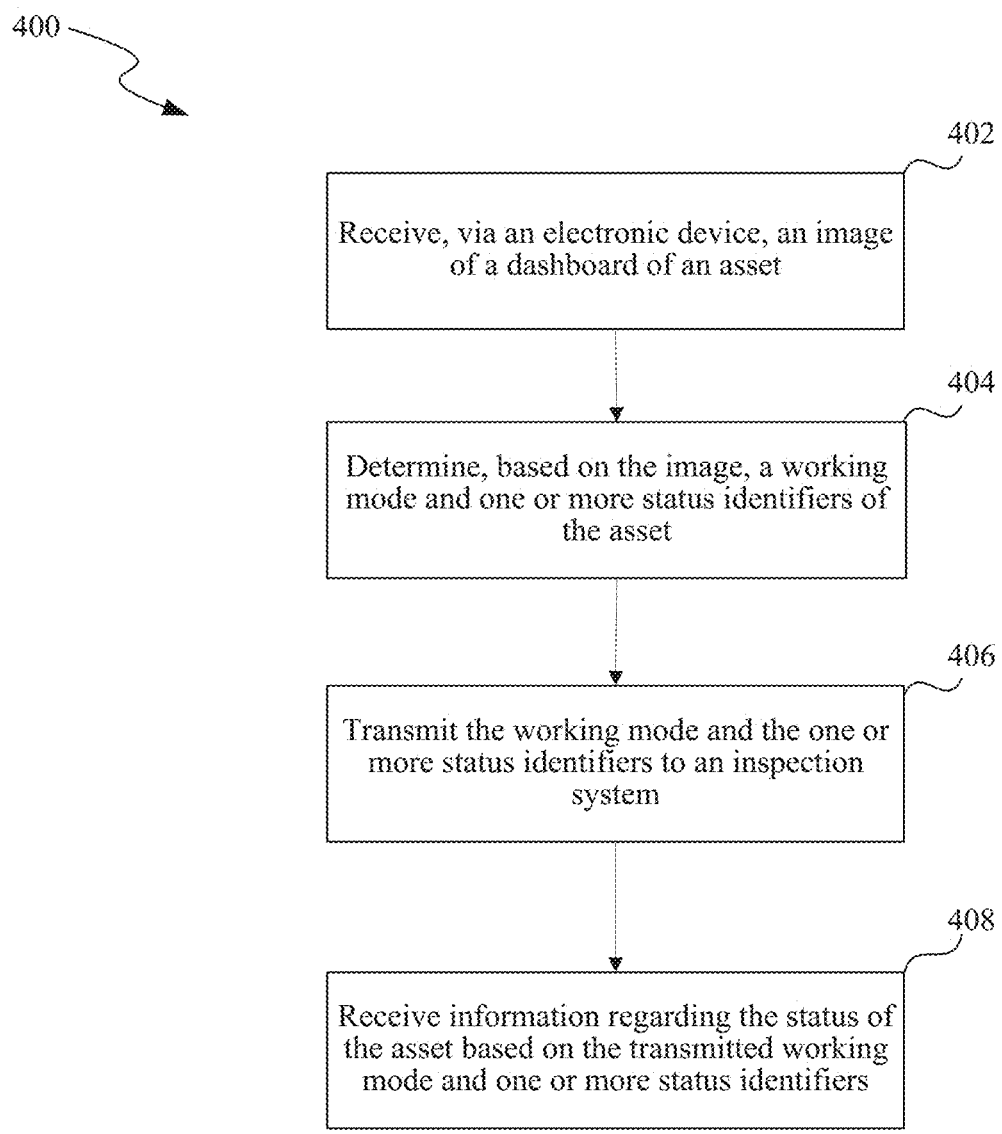
FIG. 4 is a flow diagram illustrating a method of inspecting the working status of a multi-mode asset in a communication-denied environment in accordance with various embodiments of the present technology.

FIG. 4 is a flow diagram illustrating a method 400 of inspecting the status of a multi-mode asset in a communication-denied environment in accordance with embodiments of the present technology. The method 400 is illustrated as a set of blocks, steps, operations, or processes 402-408. All or a subset of the steps 402-408 can be executed at least in part by various components of a system, such as the system 300 of FIG. 3. For example, all or a subset of the steps 402-408 can be executed at least in part by the electronic device 204 of FIGS. 2 and 3 and/or the inspection system 110 of FIGS. 1A-3. Additionally, or alternatively, all or a subset of the steps 402-408 can be executed at least in part by an operator (e.g., a user, an asset operator, etc.) of the system. Furthermore, any one or more of the steps 402-408 can be executed in accordance with the discussion above. Many of the steps 402-408 of the method 400 are discussed in detail below with reference to FIGS. 1A-3 for the sake of clarity and understanding. It will be appreciated, however, that the method 400 may be used with other suitable system in addition to those described herein.

Beginning at step 402, the method 400 can include receiving and/or obtaining an image 304 of a dashboard 202 of an asset 152. Receiving and/or obtaining the image 304 can include receiving and/or obtain the image via an electronic device 204. Step 402 can include receiving/obtaining the image 304 using any of the processes or techniques described previously herein and with reference to FIGS. 2 and 3. In some embodiments, receiving the image 304 can include at least one of the following:

(i) receiving the image 304 in response to an event corresponding to a change in the working mode 205 of the asset 152 and/or a change in one or more of the indicators 302 of the dashboard 202;

(ii) receiving the image 304 automatically, for example, based on a predetermined inspection schedule; and/or (iii) prompting the operator 206 (e.g., via the electronic device 204 and/or the dashboard 202) to use the electronic device 204 to capture the image 304.

The event can include, for example, putting the asset 152 in an "ON" state, transitioning the asset 152 between two working modes, information received by the inspection system 110, and/or any other suitable event. In some embodiments, the method 400 can further include detecting the event based on the dashboard 202 of the asset 152 (e.g., a change in one or more of the indicators) and, in response, receiving/obtain the image 304 in response to the detected event. In other embodiments, the method 400 can further include detecting the event based on the dashboard 202 and, in response, prompting a user/operator 206 to using the electronic device 204 to obtain the image 304.

The predetermined inspection schedule can include, for example, obtaining/receiving the image 304 between about once every 5 minutes to about once every week, such as at least once every 5 minutes, 10 minutes, 30 minutes, 1 hour, 2 hours, 6 hours, 12 hours, 1 day, 2 days, 3 days, or any other suitable time.

Prompting the operator 206 to capture the image 304 can include, for example, prompting the operator 206 in response to at least one of the following: (i) an event (as described previously), (ii) the predetermined inspection schedule, (iii) a determination that the communication environment is sufficient to transmit and/or receive data (as described previously), (iv) a determination that the communication was not received without error (e.g., the transmission failed, was corrupted, and/or was otherwise not error-free), and/or any other suitable prompt.

At step 404, the method 400 can further include determining a working mode 205 and one or more status identifiers of the asset 152. As described previously and with reference to FIG. 3, each of the status identifiers can correspond to and/or be displayed by one or more of the dashboard indicators 302, and can include data (e.g., the data 203) associated with the status of the asset 152 in the working mode 205. In some embodiments, determining the working mode 205 and the one or more status identifiers can include determining the working mode 205 and the one or more status identifiers based at least in part on the image 304, as described previously and with reference to FIG. 3. Step 404 can be performed at least partially by an electronic device (e.g., the electronic device 204) and/or an inspection section (e.g., the inspection system 110).

At step 406, the method 400 can further include transmitting (e.g., via the electronic device) the working mode 205 and one or more status identifiers of step 404 to an inspection system 110 when a communication environment is available. In some embodiments, transmitting the working mode 205 and one or more status identifiers of step 404 to an inspection system 110 can include at least one of the following: (i) confirming a sufficiency of the communication environment; (ii) receiving an acknowledgement of the transmission without error; and/or (iii) queuing multiple transmission when more than one working mode and/or status identifier is selected for transmission, as described previously and with reference to FIG. 2. For embodiments where step 404 is performed at least partially by an inspection system, step 406 can precede step 404 and/or include transmitting the image 304 (e.g., which, as described previously, can include and/or be used to determine the working mode 205 and the one or more status identifiers) to the inspection system. For embodiments where the method 400 is performed at least partially by the electronic device 204, step 406 can be omitted.

At step 408, the method 400 can further include receiving information regarding (e.g., associated with) the status of the asset 152. Receiving the information can include receiving the information via the electronic device 204. The received information can be based at least in part on the working mode and/or the one or more status identifiers of step 404 and/or step 406. The received information can include any information described herein, such as any of the information described previously and with reference to FIG. 3.

In some embodiments, the method 400 can further include repeating one or more of the steps 402-408 for another (e.g., a second) working mode. Although the steps of the method 400 are discussed and illustrated in a particular order, the method 400 illustrated in FIG. 4 is not so limited. In other embodiments, the method 400 can be performed in a different order. In these and other embodiments, any of the steps of the method 400 (e.g., block 406) can be performed before, during, and/or after any of the other steps of the method 400 (e.g., block 404). Moreover, a person of ordinary skill in the relevant art will recognize that the illustrated method 400 can be altered and still remain within these and other embodiments of the present technology. For example, one or more steps of the method 400 (e.g., block 406) illustrated in FIG. 4 can be omitted and/or repeated in some embodiments.

Systems and methods for inspecting the status of a multi-mode asset in a communication-denied environment in accordance with embodiments of the present technology offer a number of advantages over technologies that are presently available. As described previously, many inspection systems are generally designed for use communication-enabled assets (such as the asset 102 of FIG. 1A) and do not account for assets having one or more working modes. Accordingly, such systems may fail to account for the operational variability of multi-mode assets, and result in a relatively high rate of false-positive and/or false-negative results. Moreover, many systems generally require communication-enabled assets that have integral communication elements (e.g., the asset 102 of FIG. 1A). In contrast with such many systems, systems and methods configured in accordance with embodiments of the present technology can be configured to recognize one or more working modes of an asset, which is expected to allow for more accurate inspections and/or determinations of the asset's status in each of the working modes. Moreover, systems and methods configured in accordance with embodiments of the present technology are expected to be able to operate with assets in a communication-denied environment, such as with assets that lack communication elements, and accordingly can allow operators of these assets to determine the status of their asset in a given working mode and/or while operating in a communication-denied environment.

The techniques disclosed herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 5:
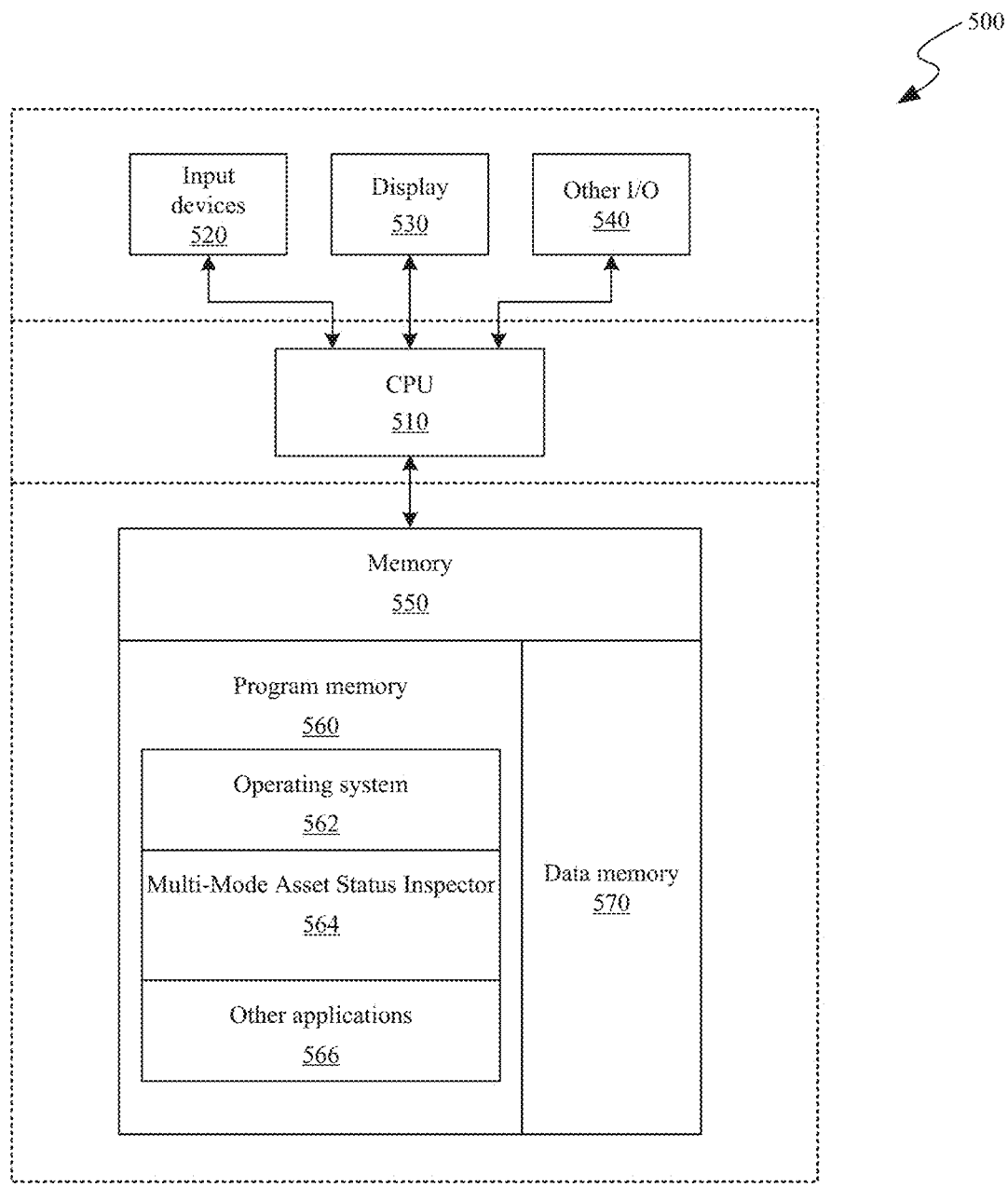
FIG. 5 is a block diagram illustrating an overview of devices on which various embodiments of the present technology can operate.

Several implementations are discussed below in more detail in reference to the figures. FIG. 5 is a block diagram illustrating an overview of devices on which some implementations of the disclosed technology can operate. The devices can comprise hardware components of a system or device 500 that inspects or determines asset status in one or more working modes (e.g., a multi-mode status), for example, such as the device 204 and/or the inspection system 110. Device 500 can include one or more input devices 520 that provide input to the CPU (processor) 510, notifying it of actions. The actions are typically mediated by a hardware controller that interprets the signals received from the input device and communicates the information to the CPU 510 using a communication protocol. Input devices 520 include, for example, a mouse, a keyboard, a touchscreen, an infrared sensor, a touchpad, a wearable input device, a camera- or image-based input device, a microphone, or other user input devices.

CPU 510 can be a single processing unit or multiple processing units in a device or distributed across multiple devices. CPU 510 can be coupled to other hardware devices, for example, with the use of a bus, such as a PCI bus or SCSI bus. The CPU 510 can communicate with a hardware controller for devices, such as for a display 530. Display 530 can be used to display text and graphics. In some examples, display 530 provides graphical and textual visual feedback to a user. In some implementations, display 530 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 540 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 500 also includes a communication device capable of communicating wirelessly or wire-based with a network node. The communication device can communicate with another device or a server through a network using, for example, TCP/IP protocols. Device 500 can utilize the communication device to distribute operations across multiple network devices.

The CPU 510 can have access to a memory 350. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 550 can include program memory 560 that stores programs and software, such as an operating system 562, Multi-Mode Asset Status Inspector 564 (which may include instructions for carrying out the methods of inspecting multi-mode asset status described herein), and other application programs 566. Memory 550 can also include data memory 570 that can include database information, etc., which can be provided to the program memory 560 or any element of the device 500.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 6:
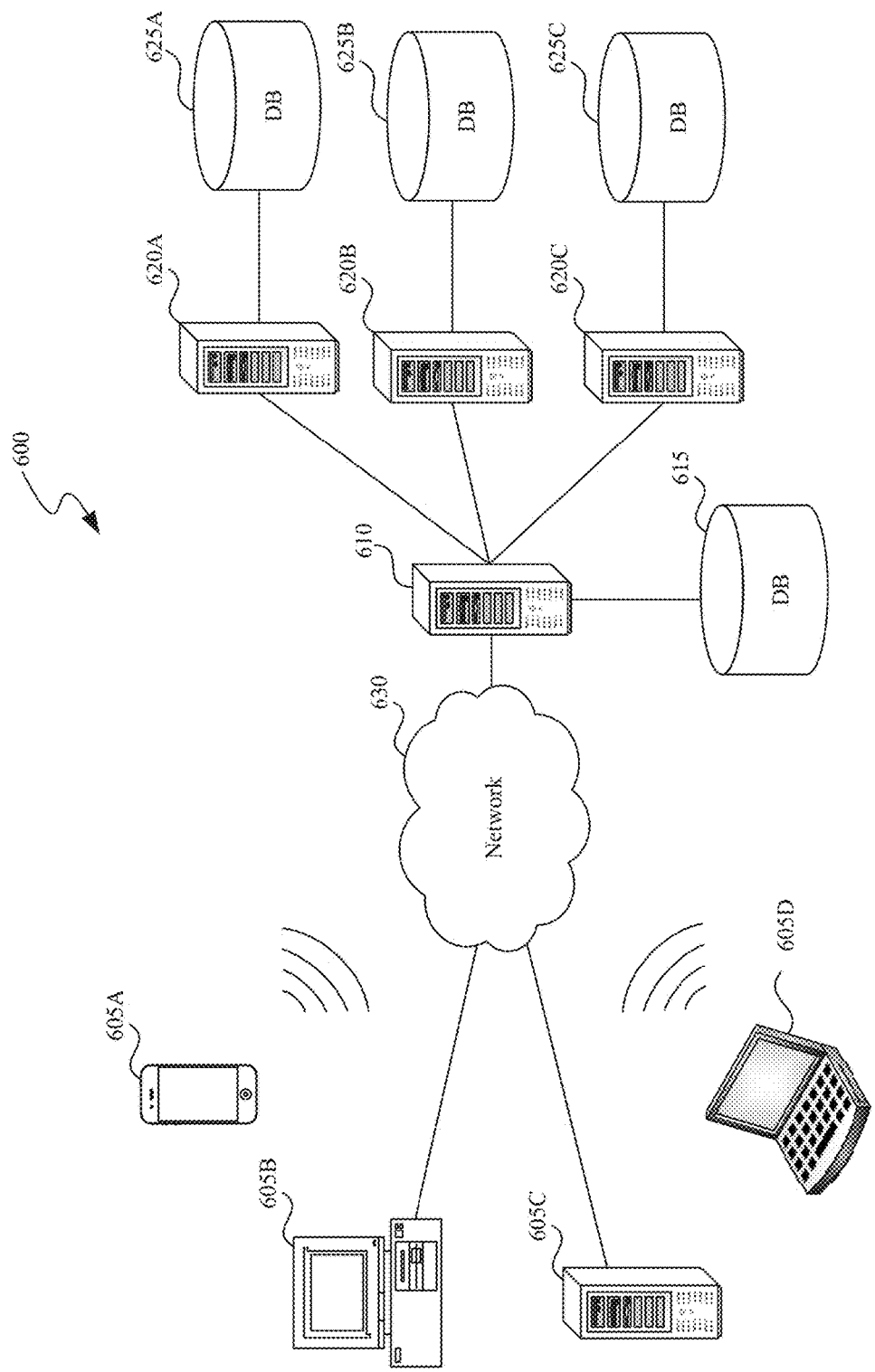
FIG. 6 is a block diagram illustrating an overview of an environment in which various embodiments of the present technology can operate.

FIG. 6 is a block diagram illustrating an overview of an environment 600 in which some implementations of the disclosed technology can operate. Environment 600 can include one or more client computing devices 605A-D, which can include the device 500. Client computing devices 605 can operate in a networked environment using logical connections through network 630 to one or more remote computers, such as a server computing device 610.

In some implementations, server computing device 610 can be an edge server that receives client requests and coordinates fulfillment of those requests through other servers, such as servers 620A-C. Server computing devices 610 and 620 can comprise computing systems, such as device 500. Though each server computing device 610 and 620 is displayed logically as a single server, server computing devices can each be a distributed computing environment encompassing multiple computing devices located at the same or at geographically disparate physical locations. In some implementations, each server computing device 620 corresponds to a group of servers.

Client computing devices 605 and server computing devices 610 and 620 can each act as a server or client to other server/client devices. Server 610 can connect to a database 615. Servers 620A-C can each connect to a corresponding database 625A-C. As discussed above, each server 620 can correspond to a group of servers, and each of these servers can share a database or can have their own database. Databases 615 and 625 can warehouse (e.g., store) information. Though databases 615 and 625 are displayed logically as single units, databases 615 and 625 can each be a distributed computing environment encompassing multiple computing devices, can be located within their corresponding server, or can be located at the same or at geographically disparate physical locations.

Network 630 can be a local area network (LAN) or a wide area network (WAN), but can also be other wired or wireless networks. Network 630 may be the Internet or some other public or private network. Client computing devices 605 can be connected to network 630 through a network interface, such as by wired or wireless communication. While the connections between server 610 and servers 620 are shown as separate connections, these connections can be any kind of local, wide area, wired, or wireless network, including network 630 or a separate public or private network.

Figure 7:
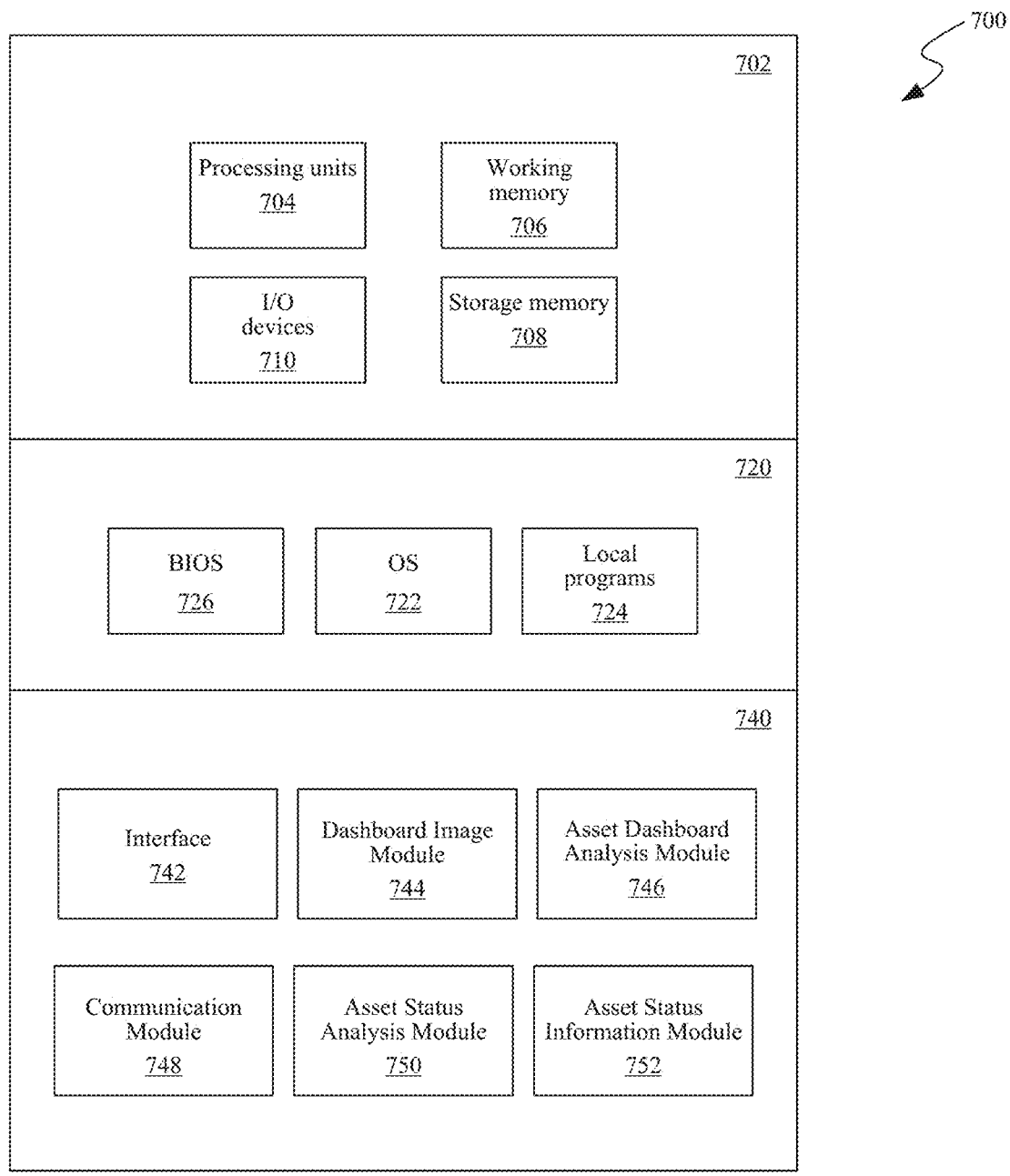
FIG. 7 is a block diagram illustrating elements which, in various embodiments, can be used in a system employing the disclosed technology.

FIG. 7 is a block diagram illustrating elements 700 which, in some implementations, can be used in a system employing the disclosed technology. In some implementations, one or more of the elements 700 can be duplicated and/or communicatively coupled across multiple systems/devices. The elements 700 include hardware 702, general software 720, and specialized elements 740. As discussed above, a system implementing the disclosed technology can use various hardware, including processing units 704 (e.g., CPUs, GPUs, APUs, etc.), working memory 706, storage memory 708, and input and output devices 710. Elements 700 can be implemented in a client computing device such as client computing devices 605 or on a server computing device, such as server computing device 610 or 620.

General software 720 can include various applications, including an operating system 722, local programs 724, and a basic input output system (BIOS) 726. Specialized components 740 can be subcomponents of a general software application 720, such as local programs 724, which may include the Multi-Mode Asset Status Inspector 564 (see FIG. 5 and description above). Specialized elements 740 can include a Dashboard Image Collection Module 744, an Asset Dashboard Analysis Module 746, a Communication Module 748, an Asset Status Analysis Module 750, an Asset Status Information Module 752, and components that can be used for transferring data and controlling the specialized components, such as interface 742. In some implementations, elements 700 can be in a computing system that is distributed across multiple computing devices or can be an interface to a server-based application executing one or more of specialized elements 740.

Those skilled in the art will appreciate that the components illustrated in FIGS. 5-7 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

INDUSTRIAL APPLICABILITY

In some embodiments, systems for detecting anomalous operating characteristics can include a Dashboard Image Collection Module 744, an Asset Dashboard Analysis Module 746, a Communication Module 748, an Asset Status Analysis Module 750, an Asset Status Information Module 752 (FIG. 7).

In operation, the Dashboard Image Collection Module 744 collects and stores the images of the dashboard (see step 402 in FIG. 4). The Asset Dashboard Analysis Module 546 analyzes the dashboard image to determine the working mode and one or more status identifiers (see step 404 in FIG. 4). In some embodiments, for example, the Asset Dashboard Analysis Module 546 includes the dashboard image analysis engine 308 (FIG. 3). The Communication Module 748 can monitor the communication environment (e.g., to determine the sufficiency of the communication environment to transmit) and can transmit the working mode and the one or more status identifiers to an inspection system (see step 406 in FIG. 4). The Asset Status Analysis Module 750 can determine the asset's status based on the working mode and the one or more status identifiers. In some embodiments, for example, the Asset Status Analysis Module 750 can include the asset status analysis engine 312 (FIG. 3). The Asset Status Information Module 752 can determine information associated with the asset's status (see, e.g., step 408). General software 720 (FIG. 7) may include instructions to repeat any of steps 402-408 of the method 400 (FIG. 4), e.g., in response to an event, at selected increments of time based on a predetermined schedule, and/or any other condition described previously.

The disclosed technology, therefore, provides for inspection of multi-mode assets in communication denied environments. In particular, the disclosed technology can determine the status of an asset in one or more working modes, and can provide information associated with the determined status in each of the working modes to an operator of the asset.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" (or the like) in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Reference throughout this specification to relative terms such as, for example, "generally," "approximately," "substantially," and "about" are used herein to mean the stated value plus or minus 10%.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

As used herein, the term "and/or" when used in the phrase "A and/or B" means "A, or B, or both A and B." A similar manner of interpretation applies to the term "and/or" when used in a list of more than two terms.

We claim:

1. A method for inspecting an asset in a communication-denied environment, the method comprising:
   receiving, via an electronic device, an image of a dashboard of the asset, wherein the image is received during a communication-denied period;
   determining, based on the image, a working mode and one or more status identifiers of the asset, wherein the one or more status identifiers correspond to a status of the asset in the working mode;
   when a communication environment is available, transmitting the working mode and the one or more status identifiers to an inspection system, wherein the transmitting includes:
      confirming sufficiency of the communication environment to transmit,
      receiving an acknowledgement of the transmission without error, or
      queuing multiple transmissions when more than one working mode and/or status identifier is selected for transmission; and
   in response to the transmitting, receiving information regarding the status of the asset based on the transmitted working mode and one or more status identifiers.

2. The method of claim 1, wherein determining the working mode and the one or more status identifiers includes:
   determining a model and a serial number of the asset; and
   comparing the image to at least one reference image of a reference dashboard, wherein the reference dashboard corresponds to a reference asset having a same model and/or serial number as the asset.

3. The method of claim 2 wherein determining the model and the serial number includes reading, via the electronic device, a barcode corresponding to the model and serial number of the asset.

4. The method of claim 2 wherein determining the model and serial number includes receiving, from the operator, an input corresponding to the model and serial number of the asset.

5. The method of claim 1 wherein determining the working mode and the one or more status identifiers includes applying an asset dashboard analysis engine to the image, wherein the asset dashboard analysis engine includes one or more rules-based models or one or more machine learning models.

6. The method of claim 5 wherein the asset dashboard analysis engine is configured to compare the image with one or more reference images, and to determine, based on the comparison, the working mode and the one or more status identifiers.

7. The method of claim 1 wherein, if the determined status is within an operating threshold associated with the working mode, the information regarding the determined status includes a message that the asset status is normal.

8. The method of claim 1 wherein the working mode is a first working mode and the image is a first image, and wherein, if the determined status is not within an operating threshold associated with the first working mode, the information regarding the determined status includes at least one of the following:
   (i) a request for additional data about the asset,
   (ii) instructions to transition the asset to a second working mode and to obtain a second image of the dashboard when the asset is in the second working mode,
   (iii) an identification of a component of the asset associated with the anomalous status, and/or
   (iii) a recommendation regarding a maintenance event for the asset based on the anomalous status.

9. The method of claim 1 wherein receiving the image includes at least one of the following:
   (i) receiving the image in response to an event, wherein the event corresponds to a change in the working mode and/or at least one of the status identifiers;
   (ii) receiving the image automatically based on a predetermined schedule; and/or
   (iii) prompting the operator to capture the image using the electronic device.

10. The method of claim 1 wherein the image is a first image, the working mode is a first working mode, the one or more status indicators are first status indicators, and the status is a first status, the method further comprising:
    obtaining, via the electronic device, a second image of the dashboard;
    determining, based on the second image, a second working mode and one or more second status identifiers of the asset, wherein—
       the one or more second status identifiers correspond to a second status of the asset in the second working mode, and
       the second working mode is different than the first working mode.

11. A system for inspecting an asset in a communication denied environment, comprising:
    one or more processors; and
    one or more memory devices having stored thereon instructions that when executed by the one or more processors cause the one or more processors to—
       receive, via an electronic device, an image of a dashboard of the asset, wherein the image is received during a communication-denied period;
       determine, based on the image, a working mode and one or more status identifiers of the asset, wherein the one or more status identifiers correspond to a status of the asset in the working mode;
       when a communication environment is available, transmit the working mode and the one or more status identifiers to an inspection system, wherein the transmitting includes—
          confirming sufficiency of the communication environment to transmit,
          receiving an acknowledgement of the transmission without error, or
          queuing multiple transmissions when more than one working mode or status identifier is selected for transmission; and
       in response to the transmitting, receive information regarding the status of the asset based on the transmitted working mode and one or more status identifiers.

12. The system of claim 11, wherein determining the working mode and the one or more status identifiers includes:
    determining a model and a serial number of the asset; and
    comparing the image to at least one reference image of a reference dashboard, wherein the reference dashboard corresponds to a reference asset having a same model and/or serial number as the asset.

13. The system of claim 11 wherein determining the working mode and the one or more status identifiers includes applying an asset dashboard analysis engine to the image, wherein the asset dashboard analysis engine is configured to compare the image with one or more reference images, and to determine, based on the comparison, the working mode and the one or more status identifiers.

14. The system of claim 11 wherein the working mode is a first working mode and the image is a first image, and wherein, if the determined status is not within an operating threshold associated with the first working mode, the information regarding the determined status includes at least one of the following:
 (i) a request for additional data about the asset,
 (ii) instructions to transition the asset to a second working mode and to obtain a second image of the dashboard when the asset is in the second working mode,
 (iii) an identification of a component of the asset associated with the anomalous status, and/or
 (iii) a recommendation regarding a maintenance event for the asset based on the anomalous status.

15. The system of claim 11 wherein receiving the image includes at least one of the following:
 (i) receiving the image in response to an event, wherein the event corresponds to a change in the working mode and/or at least one of the status identifiers;
 (ii) receiving the image automatically based on a predetermined schedule; and/or
 (iii) prompting the operator to capture the image using the electronic device.

16. The system of claim 11 wherein the image is a first image, the working mode is a first working mode, the one or more status indicators are first status indicators, and the status is a first status, the method further comprising:
 obtaining, via the electronic device, a second image of the dashboard;
 determining, based on the second image, a second working mode and one or more second status identifiers of the asset, wherein—
  the one or more second status identifiers correspond to a second status of the asset in the second working mode, and
  the second working mode is different than the first working mode.

17. One or more non-transitory, computer-readable media storing computer-executable instructions that, when executed by one or more processors, cause the one or more processors to perform a method, comprising:
 receiving, via an electronic device, an image of a dashboard of the asset, wherein the image is received during a communication-denied period;
 determining, based on the image, a working mode and one or more status identifiers of the asset, wherein the one or more status identifiers correspond to a status of the asset in the working mode;
 when a communication environment is available, transmitting the working mode and the one or more status identifiers to an inspection system, wherein the transmitting includes:
  confirming sufficiency of the communication environment to transmit,
  receiving an acknowledgement of the transmission without error, or
  queuing multiple transmissions when more than one working mode and/or status identifier is selected for transmission; and
 in response to the transmitting, receiving information regarding the status of the asset based on the transmitted working mode and one or more status identifiers.

18. The non-transitory, computer-readable media of claim 17 wherein the working mode is a first working mode and the image is a first image, and wherein, if the determined status is not within an operating threshold associated with the first working mode, the information regarding the determined status includes at least one of the following:
 (i) a request for additional data about the asset,
 (ii) instructions to transition the asset to a second working mode and to obtain a second image of the dashboard when the asset is in the second working mode,
 (iii) an identification of a component of the asset associated with the anomalous status, and/or
 (iii) a recommendation regarding a maintenance event for the asset based on the anomalous status.

19. The non-transitory, computer-readable media of claim 17 wherein receiving the image includes at least one of the following:
 (i) receiving the image in response to an event, wherein the event corresponds to a change in the working mode and/or at least one of the status identifiers;
 (ii) receiving the image automatically based on a predetermined schedule; and/or
 (iii) prompting the operator to capture the image using the electronic device.

20. The non-transitory, computer-readable media of claim 17 wherein the image is a first image, the working mode is a first working mode, the one or more status indicators are first status indicators, and the status is a first status, the method further comprising:
 obtaining, via the electronic device, a second image of the dashboard;
 determining, based on the second image, a second working mode and one or more second status identifiers of the asset, wherein—
  the one or more second status identifiers correspond to a second status of the asset in the second working mode, and
  the second working mode is different than the first working mode.

* * * * *